United States Patent [19]

Coluccio

[11] Patent Number: 5,046,544

[45] Date of Patent: Sep. 10, 1991

[54] ROLLUP DOOR VIBRATING DAMPING DEVICE FOR TRUCKS AND THE LIKE

[76] Inventor: Joseph Coluccio, 232 Seaview Ave., Staten Island, N.Y. 10305

[21] Appl. No.: 535,547

[22] Filed: Jun. 8, 1990

[51] Int. Cl.⁵ .......................................... E05D 15/06
[52] U.S. Cl. .................................. 160/201; 160/189
[58] Field of Search ............... 160/201, 207, 206, 213, 160/210, 199, 189; 52/225, 291

[56] References Cited

U.S. PATENT DOCUMENTS

| | | | |
|---|---|---|---|
| 1,286,664 | 12/1918 | Larson | 52/291 X |
| 2,319,303 | 5/1943 | Crawford | 52/291 |
| 2,779,980 | 2/1957 | Rhodes | 52/291 |
| 2,966,212 | 12/1960 | Fimbel | 160/201 X |
| 3,196,933 | 7/1965 | Schneider | 160/207 |
| 3,280,521 | 10/1966 | Keathly | 52/291 X |
| 3,424,223 | 1/1969 | Rosenblatt | 160/201 X |
| 4,575,980 | 3/1986 | Shuler | 52/291 |

*Primary Examiner*—David M. Purol
*Attorney, Agent, or Firm*—Richard L. Miller

[57] ABSTRACT

A vibrating damping device is provided for a roll up door on a truck and the like. The roll up door has a plurality of door panels hinged together that ride within a frame. The device consists of a compression mechanism mounted to the uppermost door panel, an elongated cable that keep the panels in compression at the same time as securing the door in a locked closed position.

3 Claims, 1 Drawing Sheet

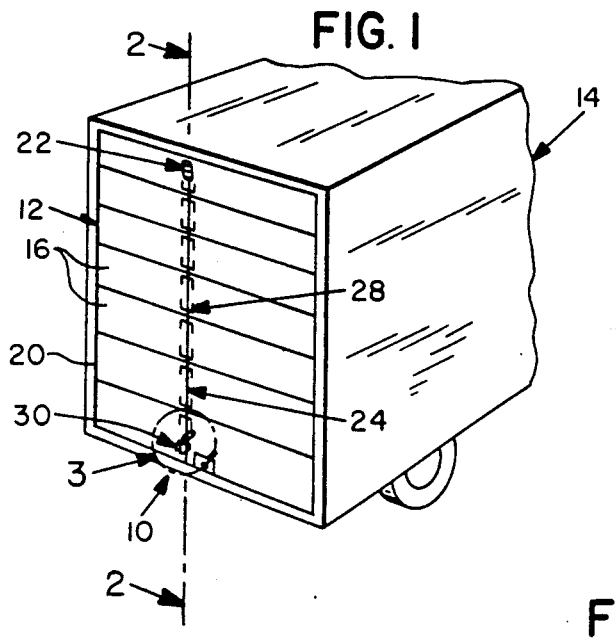
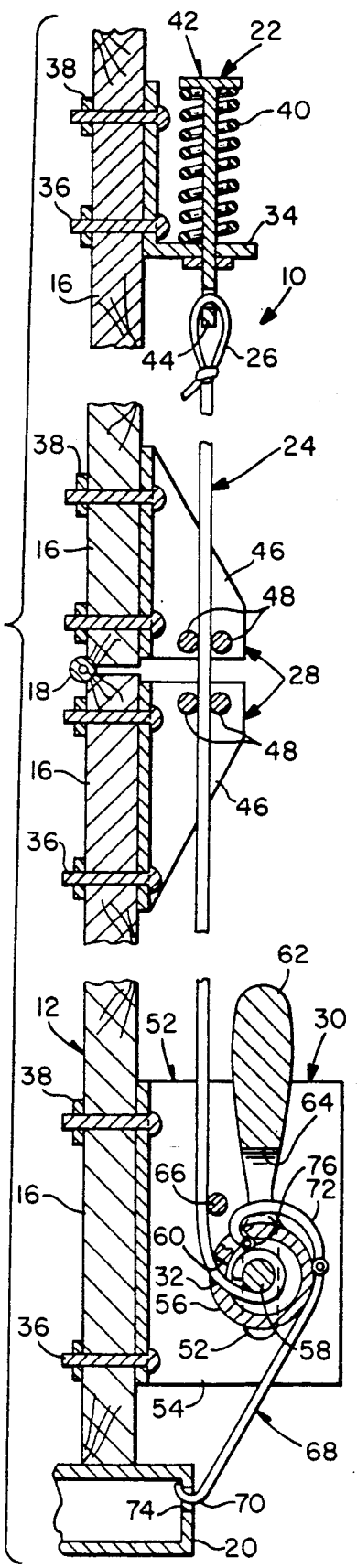
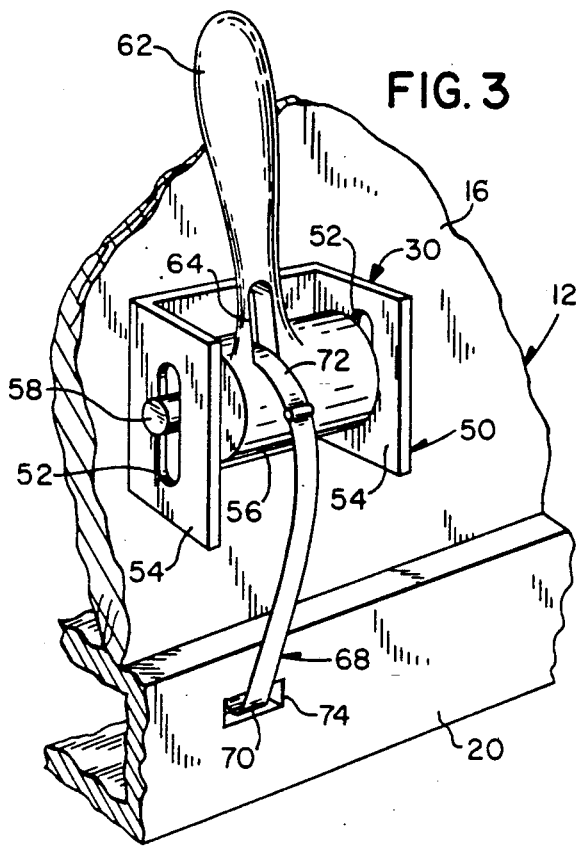

ROLLUP DOOR VIBRATING DAMPING DEVICE FOR TRUCKS AND THE LIKE

BACKGROUND OF THE INVENTION

The instant invention relates generally to roll up doors and more specifically it relates to a vibrating damping device for a rollup door on trucks and the like.

Numerous rollup doors have been provided in the prior art that are adapted to be raised and lowered in a door opening. For example, U.S. Pat. Nos. 4,690,194 to Seuster; 4,738,296 to Hatch; and 4,794,973 to Perisicall are illustrative of such prior art. While these units may be suitable for the particular purpose to which they address, they would not be as suitable for the purpose of the present invention as hereafter described.

SUMMARY OF THE INVENTION

A primary object of the present invention is to provide a vibrating damping device for a roll up door on trucks and the like that will overcome the shortcomings of the prior art devices.

Another object is to provide a vibrating damping device for a roll up door on a truck and the like which will help protect the panels of the roll up door from vibrating and breaking.

An additional object is to provide a vibrating damping device for a roll up door on a truck and the like that will reduce the need for replacing the panels and/or associated hardware of the roll up door thus saving time and money.

A further object is to provide a vibrating damping device for a roll up door on a truck and the like that is simple and easy to use.

A still further object is to provide a vibrating damping device for a roll up door on a truck and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that may be made in the specific construction illustrated and described within the scope of the appended claims.

BRIEF DESCRIPTION OF THE DRAWING FIGURES

The figures in the drawings are briefly described as follows:

FIG. 1 is a diagrammatic perspective view of the rear portion of a truck illustrating the instant invention installed thereon;

FIG. 2 is a cross sectional view taken on line 2—2 of FIG. 1 of the instant invention installed on a roll up door of a truck; and FIG. 3 is enlarged perspective view of the torsion mechanism in the dotted circle of arrow 3 in FIG. 1.

DETAILED DESCRIPTION OF THE PREFERRED EMBODIMENTS

Turning now descriptively to the drawings, in which like reference characters denote like elements throughout the several views, FIG. 1 and 2 illustrates a vibrating damping device 10 for a roll up door 12 on a truck 14 and the like. The roll up door 12 has a plurality of door panels 16 hinged together at 18 that ride within a frame 20.

The device 10 consists of a compression mechanism 22 mounted to the uppermost door panel 16. An elongated cable 24 is attached at its upper end 26 to the compression mechanism 22. A guide mechanism 28 is for properly extending the cable 24 downwardly past the door panels 16. A tension mechanism 30 is mounted to the lowermost door panel 16 with the lower end 32 of the cable 24 attached thereto. The tension mechanism 30 can be clamp locked to the lowermost portion of the frame 20, causing tension in the cable 24 and placing the door panels 16 in compression, thus preventing vibration of the door panels 16 when the truck 14 is in motion.

The compression mechanism 22 includes an L-shaped bracket 34 mounted by bolts 36 and nuts 38 to the uppermost door panel 16. A spring 40 is carried on the L-shaped bracket 14. A T-shaped rod 42 extends through the spring 40 and the L-shaped bracket 34, in which the upper end 26 of the cable 24 is attached to the lower end 44 of the T-shaped rod 42.

The guide mechanism 28 includes a plurality of guide brackets 46. Each has a pair of guide pins 48 and is mounted on one of the door panels 16 by the bolts 36 and nut 38 adjacent the hinge 18 thereof. The cable 24 can extend downwardly past the guide pins 48 on the guide brackets 46.

The tension mechanism 30 as best seen in FIGS. 2 and 3, includes a tension bracket 50 mounted to the lowermost door panel by the bolts 36 and nuts 38. The tension bracket 50 is U-shaped in cross section and has two bearing slots 52, in which each slot 52 is in each side wall 54 of the tension bracket 50.

A hollow drum 56 is provided with a concentric shaft 58 extending therethrough, in which each end of the shaft 58 rides in one of the bearing slots 52. The drum 56 has a side aperture 60 therein. A tensioning handle 62 has a clearance slot 64 therethrough. A guide pin 66 extends between the side walls 54 of the tension bracket 50.

An arm 68 has a hook 70 at a lower end and a hinged portion 72 at an upper end whereby the hook 70 is removably connected in an aperture 74 to the lowermost portion of the frame 20. A pivot pin 76 affixes the upper end of the hinged portion 72 of the arm 68 that passes the clearance slot 64 in the handle 62 to the drum 56. The lower end 32 of the cable 24 can ride past the guide pin 66, enter the side aperture 60 in the drum 56 and wrap around the shaft 58. When the handle 62 is lifted up the arm 68 will be clamped and locked causing tension in the cable 24 and placing the door panels 16 in compression.

It is important to note that the geometry of this mechanism is such that tension in arm 68 cause a force to be transmitted to pin 76 in a direction that keeps the mechanism locked.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A vibrating damping device for a roll up door on a truck and the like, the roll up door having a plurality of door panels hinged together that ride within a frame, said device comprising:

a) a compression mechanism mounted to the uppermost door panel, wherein said compression mechanism includes:
  i) an L-shaped bracket mounted to the uppermost door panel;
  ii) a spring carried on said L-shaped bracket; and
  iii) a T-shaped rod extending through said spring and said L-shaped bracket, in which the upper end of said cable is attached to the lower end of said T-shaped rod;
b) an elongated cable attached at its upper end to said compression mechanism;
c) a guide mechanism for properly extending said cable downwardly past the door panels; and
d) a tension mechanism mounted to the lowermost door panel with the lower end of said cable attached thereto, said tension mechanism can be hooked to the lowermost portion of the frame, causing tension in said cable and placing the door panels in compression, thus preventing vibration of the door panels when the truck is in motion.

2. A vibrating damping device as recited in claim 1, wherein said guide mechanism includes a plurality of guide brackets, each having a pair of guide pins and mounted on one of the door panels adjacent the hinge thereof, so that said cable can extend downwardly past said guide pins on said guide brackets.

3. A vibrating damping device as recited in claim 2, wherein said tension mechanism includes:
a) a tension bracket mounted to the lowermost door panel, said tension bracket being U-shaped in cross section and having two bearing slots in which each slot is in each side wall of said tension bracket;
b) a hollow drum with a concentric shaft extending therethrough in which each end of said shaft rides one of said bearing slots, said drum having a side aperture therein;
c) a tensioning handle affixed to said drum said tensioning handle having a clearance slot therethrough;
d) a guide pin extending between said side walls of said tension bracket;
e) an arm having a hook at a lower end and a hinged portion at an upper end whereby said hook is removably connected to the lowermost portion of the frame; and
f) a pivot pin affixing the upper end of said hinged portion of said arm that passes the clearance slot in said handle to said drum whereby the lower end of said cable can ride past said guide pin, enter said side aperture in said drum and wrap around said shaft so that when said handle is lifted up said arm will be clamp and locked causing tension in said cable and placing the door panels in compression.

* * * * *